United States Patent [19]
Bendixen

[11] 3,924,653
[45] Dec. 9, 1975

[54] DEVICE FOR TEMPORARY STORAGE OF WASTE AND STORM WATER

[76] Inventor: Stein Bendixen, Vatogrand 12, S-19400 Upplands Vasby, Sweden

[22] Filed: Mar. 26, 1974

[21] Appl. No.: 454,907

[30] Foreign Application Priority Data
Mar. 27, 1973 Sweden.............................. 7304254
June 8, 1973 Sweden.............................. 7308200

[52] U.S. Cl................................. 137/236; 138/42
[51] Int. Cl.²......................................... F15D 1/00
[58] Field of Search....................... 137/236; 138/42

[56] References Cited
UNITED STATES PATENTS
2,012,495 8/1935 Bradbeer .......................... 137/236 X
3,846,229 11/1974 Kallmes ................................. 138/42

Primary Examiner—Alan Cohan

[57] ABSTRACT

The invention concerns a device for temporary storage of waste and rain water supplied to a pipe network. The device provides that at least the first part of the large quantities of water flowing into the pipes at temporarily occurring peak loads of the pipe network and thereby constituting a flow exceeding a predetermined basic or normal flow for the pipe network or parts thereof, is temporarily stored in one or more places in at least the upstream located pipes of the network. The water temporarily stored in this way is then permitted to run off successively as the supply of the large quantities of water diminishes or ceases. The device of the invention comprises a flow regulator which is arranged to limit an upstream space of the pipe for the temporary storage of water when the flow exceeds a predetermined basic flow.

12 Claims, 22 Drawing Figures

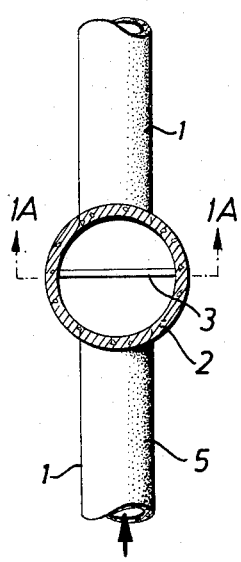
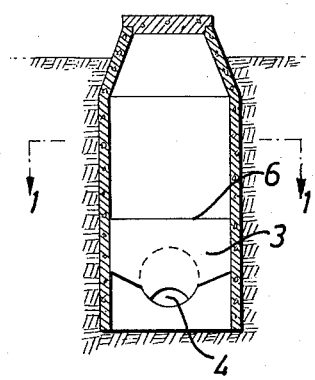
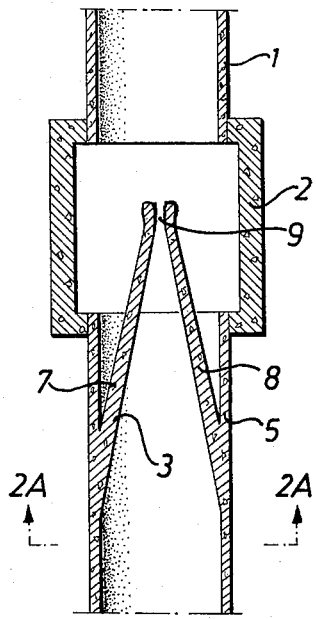
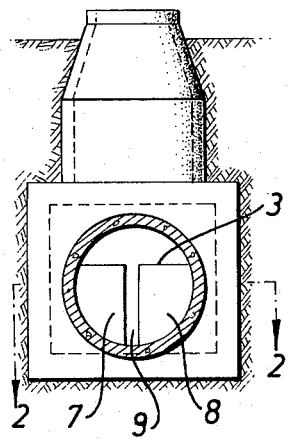
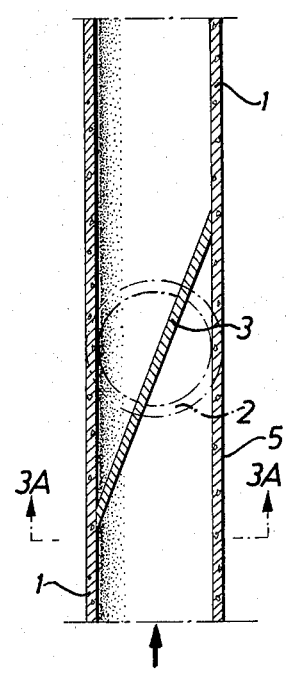
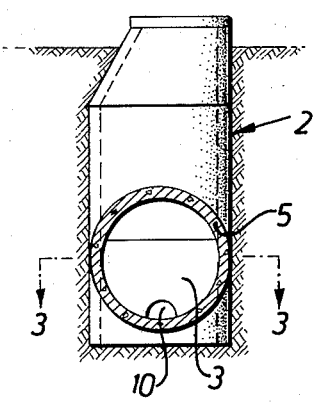

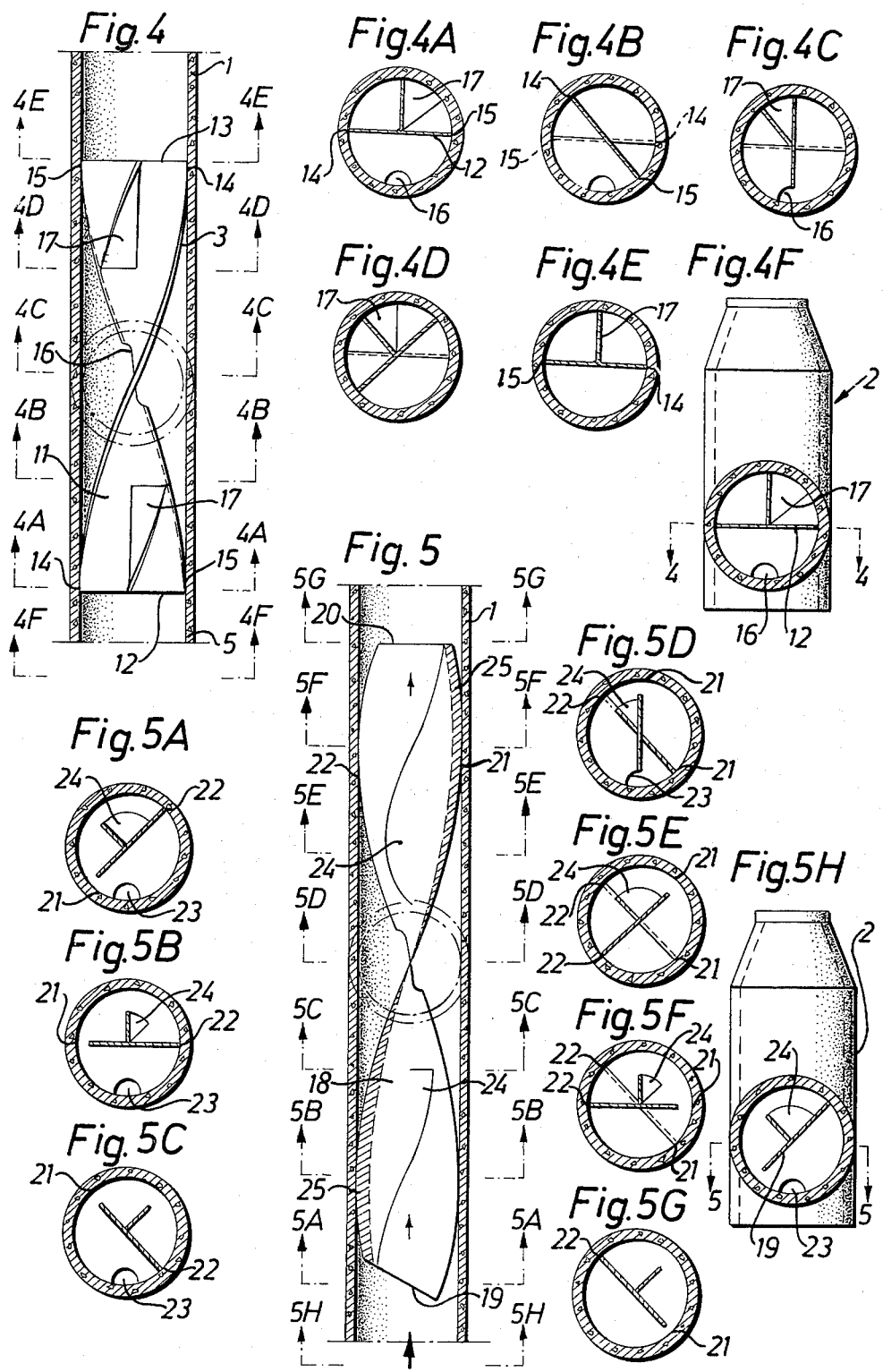

DEVICE FOR TEMPORARY STORAGE OF WASTE AND STORM WATER

BACKGROUND OF THE INVENTION

The present invention refers to a device for temporary storage of waste water and storm or rain water or the like which is supplied into a pipe network draining an area and which can be connected to a treatment or water cleaning plant or similar plant.

A drainage or sewerage network which in addition to sanitary sewage and industrial wastes also receives rainwater or other precipitation, also referred to as storm water, is dimensioned so that flooding does not occur or is as far as possible prevented during infrequent, very violent torrential rain. Normally the risk of flooding is accepted at a frequency of between once every second year and once every tenth year. Such violent but infrequently occurring rain may vary in duration, such as between 10 and 120 minutes, but in conditions applicable to Sweden among other countries the general rule is that the shorter the duration of the rain the more intensive it is, so that the volume of rain collected does not essentially increase with an extended duration of the rain.

For the dimensioning of a pipe network which is to drain a given area, there is as previously mentioned the practical consequence that pipes intended for use in the uppermost parts of the drainage area should be dimensioned for short duration intensive rain, while pipes or main pipe lines located at lower altitudes should be dimensioned for rain of longer duration. However, a need has arisen of being able to reduce the maximum capacity of these pipes in order to effect thereby considerable savings of pipe material.

Developments in the collection of storm water favour some form of treatment before its discharge into the receiving waters. For treatment plants of all kinds the rule applies that peak loads determine the size of the plant and thereby the magnitude of the costs of construction. In consequence the need has arisen of being able to cut off the peaks of receiving waters without discharging untreated water into the receiver by means of temporary storage of said water peak for subsequent treatment after the rain has ceased. For this purpose the construction of storages in connection to the main pipes has been proposed, but it is obvious that such storages would be space-consuming and expensive to build.

SUMMARY OF THE INVENTION

The above mentioned problems are solved in a satisfactory manner by the present invention, in accordance with which at least the first part of the large quantities of water flowing into the pipes at temporarily occurring peak loads of the pipe network and thereby constituting a flow exceeding a previously determined basic or normal flow for the network or parts thereof, is temporarily stored in one or more places in at least the pipes located in the upstream part of the network, after which the temporarily stored water is permitted to run off as the supply of the large quantities of water diminishes or after this supply ceases. According to the present invention use is thus made of the volume of the drainage or sewage pipe network itself, preferably in the upstream parts of the drainage area, for the temporary storage of waste or storm water, the intention being for shorter or longer periods of time to equalize the flow of water to the treatment plant or similar plant situated at the discharge of the pipe network. The pipes in the lower parts of the drainage area are thus relieved so that they can receive and pass on to the treatment plant the precipitation or other water in this part of the drainage area before large quantities from the upstream parts of the drainage area have been conveyed down to the lower parts of the drainage system. Yet, it is possible to obtain temporary storage of water in a similar manner at one or more places in the pipe or pipes in the lower sections of the drainage area or between these sections and the parts situated upstream.

The device of the present invention comprises a damming or flow control element in the following referred to as flow regulator, for each storage place in the pipe network, the flow regulator being so placed in a pipe as to cut off or limit an upstream section of the pipe for the temporary storage of water when the flow of water supplied exceeds a previously determined basic or normal flow for the pipe in question, the flow regulator being provided with an opening or an opening being formed between the flow regulator and the bottom part of the pipe, said opening permitting the passage of water in a flow substantially corresponding to the previously determined basic or normal flow. Characteristic embodiments of the flow regulator are defined by the following disclosure. In accordance with a specific embodiment of the invention the flow regulator consists of an oblong blade-screw-shaped body having two opposite short or end sides lying at an angle to the horizontal plane, the two opposite long sides of the body extending in a spiral form along the inner surface of the pipe in opposite directions at a rotation of 260° – 280°, preferably 265° – 275° between the short or end sides. It has been shown that a flow regulator with an angle of rotation within the stated invervals results in an improved damming or storage effect which is most pronounced in the preferred range of 265° and 275°, the optimum storage effect being attained at an angle of rotation of 270°. It is preferred in this regard that at least the rear short side of the flow regulator seen in the direction of the flow should be at an angle of 45° in relation to the horizontal plane. It has also shown advantageous to design said flow regulator so that an opening or slot is formed between the upper long side of the flow regulator and the inside of the pipe.

By the present invention it is obtained, among other things, the important benefits that the flow to a treatment or similar plant present at the discharge of the pipe network can be equalized by the temporary storages of sewage water in the upstream sections of the network and that the necessary pipe dimensions in the lower part of the network can be reduced. The flow regulators in accordance with the invention ca be installed in existing pipe networks as well as in networks under construction.

Characteristic of the use of flow regulators in accordance with the invention is that, expressed in other words, the flow capacity of the pipes at low filling levels is virtually the same as the capacity of the pipes without these flow regulators. In the case of these basic flows the pipes shall or ought to be self-cleaning. In the case of increasing flow levels the use of flow regulators in accordance with the invention implies that the flow increases only slightly, for example up to flow levels of 70 %. When the pipe is entirely dammed or filled up the capacity is not significantly lower than for pipes without said flow regulators.

BRIEF DESCRIPTION OF DRAWINGS

The invention will be described in more detail below with respect to suitable embodiments of flow regulators, reference being made to the attached schematic drawings, in which FIG. 1 shows in plan view a pipe with a flow regulator, FIG. 1A shows a section taken along the line 1A—1A in FIG. 1, FIG. 2 shows in plan view a pipe with another flow regulator, FIG. 3 shows in plan view a pipe with still another flow regulator, FIG. 3A is a section in accordance with the line 3A—3A in FIG. 3, FIG. 4 shows in plan a pipe form above with a flow regulator in accordance with an embodiment of the present invention, FIG. 4A – 4E are various sections in accordance with corresponding lines in FIG. 4, FIG. 4F is a section in accordance with the line 4F—4F in FIG. 4, in which a centrally located manhole is shown, FIG. 5 shows a pipe from above with a flow regulator in accordance with another embodiment of the invention, FIG. 5A – 5G are various sections in accordance with the corresponding lines in FIG. 5, and FIG. 5H is a section in accordance with the line 5H—5H in FIG. 5, in which a centrally located manhole is shown.

DESCRIPTION OF THE INVENTION

In the drawings the reference number 1 denotes a pipe provided with a so-called manhole 2 and a damming element or flow regulator 3 in accordance with the present invention. The manhole shown in FIG. 1 has thereby an inner diameter larger than the inner diameter of the pipe, whereas the manholes shown in the other FIGURES have an internal breadth or diameter about the same as the diameters of the pipes.

As shown in FIG. 1 the flow regulator 3 is made with plane form and is substantilly placed vertically in the manhole at right angle to the centre line of the pipe, but it can also be placed at another angle with the desired damming or controlling function retained. As will be seen in greater detail in FIG. 1A, the flow regulator 3 is provided with a recess 4 permitting the passage of water in a flow essentially corresponding to the predetermined basic or normal flow for the pipe. The recess 4 is preferably centrally located in relation to the upstream section 5 of the pipe. The effective height of the flow regulator 3, that is to say the position of its upper edge 6 in relation to the bottom of the upstream section 5 of the pipe at the discharge into the manhole is determined, amongst other things, by the slope of the upstream section 5 of the pipe and the length of this pipe which it is desired to use or is available for the intended temporary storage of waste or storm water. The flow regulator 3 shown in FIG. 2 consists of two plane, vertically mounted plates 7, 8 placed diagonally into the vertical centre plane of the pipe to form a slot-like opening 9 permitting the passage of water in a flow substantially corresponding to the basic flow of the pipe. The form of the opening 9 can be varied. Thus it can be broader at its lower part, for example in the shape of a triangle by the sloping the plates 7, 8 inwardly. Between at least those parts of the plates 7, 8 located in the manhole a bottom wall can be arranged. As may be seen in FIG. 2A, the plates 7, 8 are so dimensioned that about 30% of the flow surface area of the pipe is left free above the flow regulator 3. The plates 7, 8 may, however, be dimensioned so that the pipe will be entirely blocked except the opening 9, and additional storage capacity in the upstream pipe 5 can be obtained by designing the plates so that their upper edges in the manhole 2 are located above the orifice of the pipe 5 in the manhole.

The flow regulator 3 shown in FIG. 3 has a plane form and is placed substantially vertically in the pipe 1 at an angle to the centre line of the pipe, whereby the middle section of the flow regulator 3 is located in the manhole 2. At the lower edge of this middle section there is a recess 10 permitting the passage of water in a flow essentially corresponding to the predetermined basic flow for the pipe. The flow regulator 3 is so dimensioned that about 30% of the flow surface area of the pipe is left free above the flow regulator. It can, however, be formed so as to allow the pipe to be entirely blocked with the exception of the recess 10 and the storage capacity of the upstream section 5 can be further increased by designing the middle section of the flow regulator located in the manhole so that its upper edge is positioned above the orifice of the upstream pipe 5 in the manhole.

The flow regulator shown in FIG. 4 consists of an oblong or extended blade-screw-shaped body 11, which is or could be conceived of as being made of a plane rectangular plate. The two opposite short sides 12, 13 of the body 11 are located substantially horizontally in the pipe 1, and the two opposite long sides 14, 15 of the body extend in a spiral form along the inner surface of the pipe in opposite directions during a rotation of 180° between the short sides 12, 13, as will be seen from the sections shown in FIGS. 4A – 4E. On the underside of the vertical middle section of the body there is a recess 16, permitting the passage of water in a flow essentially corresponding to the basic flow of the pipe. The function of damming or flow control is thus effected by the lower part of the body seen from the vertical middle section according to FIG. 4C. Even if the regular spirally shaped body is preferable in order to obtain the desired low resistance to flow, the storage capacity of the upstream pipe can be increased by extending the ends of the body at the short sides upwards in the desired degree and direction. The storage capacity can be still further improved with the aid of two wings 17 attached to both end portions of the body, the design of which is shown in detail in FIG. 4 and relevant cross-sections.

The flow regulator according to FIG. 5, which is an improvement of that according to FIG. 4, consists of an oblong blade-screw-shaped body 18, which is or can be conceived as being formed of a plane oblong plate. As will be seen in FIG. 5, the rear short side 19 is bevelled, whereas the front short side 20 is straight. The blade-screw-shaped body 18 is so placed in the pipe 1 that the short sides 19, 20 lie at an angle of 45° to the horizontal plane, whereby the two opposite long sides 21, 22 extend along the inner surface of the pipe in opposite directions with a rotation angle of 270° between the two short sides 19, 20, as will be seen from the cross-sections shown in FIGS. 5A – 5G. On the underside at the vertical middle section of the body there is a recess 23, which is so dimensioned as to permit the passage of water in a flow essentially corresponding to the basic flow of the pipe. The storage capacity can be still further improved with the aid of two longitudinal wings 24 fixed on the two end portions of the body, the design and location of which are shown in detail in FIG. 5 and relevant cross-sections. Each wing is thus fixed to the upper side of the flow regulator and forms in each cross-section a substantial right-angle with the flow regulator. The upper free long sides of the wings suitably extend at a distance from the inner surface of the pipe at a rotation angle of substantially 90°. The rear end edges of the wings are suitably bevelled so as to avoid the depositing of impurities on the wings. The long side 21 following the upper part of the pipe 1 is not contacting this part, but a slot or opening 25 is formed between the long side 21 and the upper part of the inner surface of the pipe. In this way trapped air in the water can more easily pass through the flow regulator as can also existing impurities present in the water. As previously mentioned and indicated on the drawings, the rear short side 19 is bevelled in relation to the direction of the water flow, as is shown by arrows in FIG. 5. The slanting short side 19 thereby prevents impurities in the water to be held thereon and ensures that they slide along it in direction to the slot 25.

The invention is not limited to the embodiments of the flow regulator described above and shown in the drawings, but can be designed and modified in many different ways within the scope of the following claims. The flow regulator can be placed in any desired locations in a pipe network, suitably but not necessarily, in or in connection with existing inspection manholes. The expression "pipe network" used in this sense also refers to sewage systems consisting of or including one or more tunnels having diameters of several meters. Thus, flow regulators can also be mounted with advantage in such large tunnels. The flow regulator can be mounted in a manhole or a pipe by means of suitable mounting or attachment means or it may also constitute an integrated part of the manhole or the pipe. The flow regulators can be manufactured of any suitable material such as iron, steel, plastics or concrete.

What I claim is:

1. A device for the temporary storage of waste and storm water or the like supplied into a pipe network draining an area and which can be connected to a treatment or similar plant comprising a flow regulator comprising an oblong blade-screw-shaped body having two opposite substantially horizontally placed short sides and two opposite long sides extending in a spiral form along the inside inner surface of the pipe, said flow regulator being so arranged in a pipe that it limits an upstream space of the pipe for the temporary storage of water when the flow of water supplied exceeds a predetermined basic or normal flow of the pipe in question and having an opening permitting the passage of water through said pipe beyond said flow regulator in a flow substantially corresponding to the determined basic or normal flow.

2. A device according to claim 1, wherein said flow regulator being arranged in or in the vicinity of an inspection manhole or the like located in the pipe.

3. A device according to claim 1, wherein said body is provided with wings arranged at the end portions of the body.

4. A device according to claim 1, wherein said two opposite short sides are placed at an angle to the horizontal plane, while the two opposite long sides of the body extend in a spiral form along the inner surface of the pipe at a rotation angle of between 260° and 280° between said short sides.

5. A device according to claim 4, wherein said long sides extend at a rotation angle of 270° between said short sides.

6. A device according to claim 4, wherein at least the rear short side seen in the direction of the flow is at an angle of about 45° to the horizontal plane.

7. A device according to claim 4, wherein said body is provided with longitudinal wings at its end portions, which in each cross-section form a substantially right angle with the body.

8. A device according to claim 7, wherein the upper long side of each wing extends at a distance from the inner surface of the pipe.

9. A device according to claim 4, wherein the long side of the body following the upper portion of the pipe forms a slot or opening between itself and the inner surface of the pipe.

10. A device according to claim 4, wherein the rear short side is bevelled in relation to the direction of the flow.

11. A device according to claim 1 wherein said opening is formed by a hole in said flow regulator.

12. A device according to claim 1 wherein said opening is formed by a space between said flow regulator and said pipe.

* * * * *

UNITED STATES PATENT AND TRADEMARK OFFICE
CERTIFICATE OF CORRECTION

PATENT NO. : 3,924,653
DATED : December 9, 1975
INVENTOR(S) : Stein Bendixen

It is certified that error appears in the above-identified patent and that said Letters Patent are hereby corrected as shown below:

Claim 4 should read as follows:

4. A device for the temporary storage of waste and storm water or the like supplied into a pipe network draining an area which can be connected to a treatment or similar plant comprising a flow regulator comprising an oblong blade-screw-shaped body having two opposite short sides placed at an angle to the horizontal plane and two opposite long sides extending in a spiral form along the inside inner surface of the pipe at a rotation angle of between 260° and 280° between said short sides, said flow regulator being so arranged in a pipe that it limits an upstream space of the pipe for the temporary storage of water when the flow of water supplied exceeds a predetermined basic or normal flow of the pipe in question and having an opening permitting the passage of water through said pipe beyond said flow regulator in a flow substantially corresponding to the determined basic or normal flow.

Signed and Sealed this

Seventh Day of October 1980

[SEAL]

Attest:

SIDNEY A. DIAMOND

Attesting Officer

Commissioner of Patents and Trademarks